Feb. 22, 1966 P. CHAVE ETAL 3,236,300

HEAT SCREEN STRUCTURE

Filed July 15, 1963

United States Patent Office 3,236,300

Patented Feb. 22, 1966

3,236,300

HEAT SCREEN STRUCTURE

Paul Chave and Michel Breuille, Firminy, France, assignors to Compagnie des Ateliers et Forges de la Loire (St. Chammond-Firminy-St. Etienne-Jacob Holtzer), Paris, France Filed July 15, 1963, Ser. No. 294,993
Claims priority, application France, July 16, 1962, 904,078, Patent 1,344,280
3 Claims. (Cl. 165—136)

Figure 1:
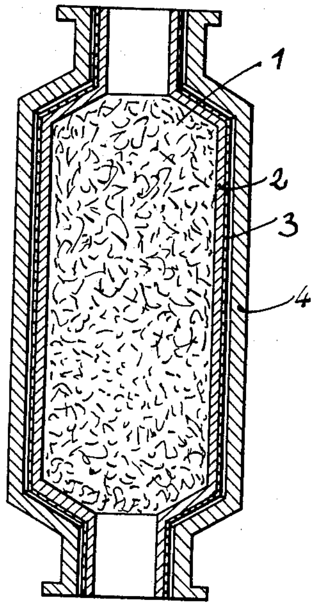

This invention relates to heat barrier structures for limiting the rate of heat transfer between surfaces at different temperatures. Its main object is to provide heat barrier or screen structures which will have very high effectiveness while occupying a minimum of space.

Heat screen structure according to the invention essentially comprises at least one wire mesh, wire fabric, metal screen, or equivalent generally flat perforate element made from metallic material, interposed between the surfaces that are to be thermally screened from each other. It has been found that the perforate metal screening element or structure thus provided acts to limit the rate of heat transfer by radiation from the hotter to the cooler surface in a highly efficient manner.

The number of single screen elements thus provided in a screening structure according to the invention depends on the degree of screening required, and essentially on the temperature difference between the surfaces that are to be thermally screened one from the other.

One or more of the screening elements may be positioned directly adjacent to one of the two surfaces or to each of the two surfaces that are to be screened from one another; thus there may be provided an assembly or lamination of screen elements having opposite sides directly adjacent the respective surfaces.

Best results have been obtained when the screening elements used have a relatively large number of mesh openings per unit area while the thickness of the wire from which the screens are woven should preferably be as large as possible, so that the open area of each mesh is reduced to a minimum.

When a plurality of such wire mesh screening elements are placed in superposed relation between the two surfaces, direct radiation from the hotter to the cooler surface is effectively prevented.

The temperature of each successive screen is substantially lower than the temperature of the screen preceding it when one moves away from the hotter towards the cooler surface. By providing a suitable number of such screen elements proportionate with the temperature differential to be maintained between the surfaces it is found that the desired heat isolation can generally be achieved with a minimum of space required for the screening structure.

In order to minimize heat transfer by conduction between adjacent screen elements while enabling the elements to be spaced very close to one another, direct contact between the adjacent elements should be avoided or minimized. It has been found convenient, for this purpose, according to a feature of the invention, to interpose between adjacent screen elements a spacing element which may conveniently assume the form of another wire screen, mesh or the like, wherein the mesh number per unit area is substantially lower than that provided in the screen elements proper. The spacer screens preferably employ small-gauge wire so that the mesh openings are wide. Direct heat conducting paths through the assembly are thus minimized.

Figure 2:
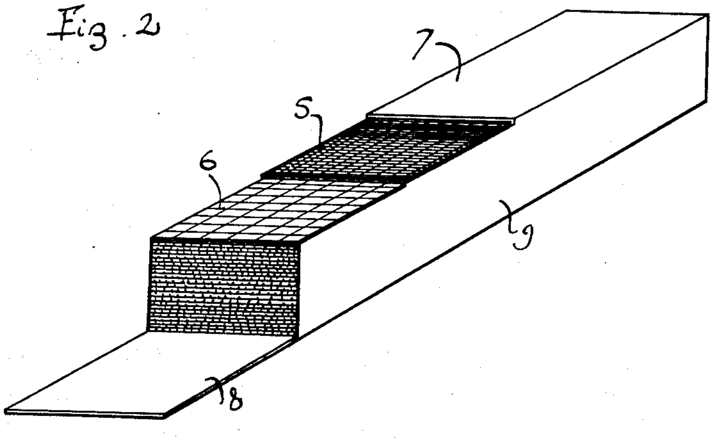

In the accompanying drawings, wherein exemplary embodiments of the invention are illustrated without limitative intent:

FIG. 1 is a simplified elevational section of a heat storage unit utilizing the teachings of the invention; and FIG. 2 is a fragmentary perspective view of a self-supporting heat screening assembly according to an embodiment of the invention.

Screening assemblies according to the invention will generally comprise a number of closely-spaced relatively fine-mesh wire screens maintained in regularly-spaced relation by a number of interposed spacer screens of relatively wide mesh. Such screening assemblies may be contructed in situ, as by successive application of the screen elements in the requisite order over either one, or each, of the surfaces that are to be screened from one another; or they may be prefabricated in the form of a self-supporting assembly and inserted bodily in the desired location. The outer elements of the assembly are preferably comprised of fine-mesh screen elements. Such screening assemblies may be provided in standard thicknesses so that any desired number of the assemblies may be used as occasion demands. While the screen element of the invention has been described as generally flat, it is to be understood that their shape will usually conform to that of the surfaces between which they are interposed, and such shape is not necessarily flat, but may be part-spherical, cylindrical, or of other form.

Referring to FIG. 1 of the accompanying drawings, the invention is there illustrated in its application to a high-pressure heat-accumulator or heat-storage apparatus of generally conventional construction. The heat-storage unit comprises a mass 1 of suitable porous material, adapted to withstand high temperature of operation, of about 900° C., and contained within an inner shell 2. The inner shell 2 is made of a suitable material, e.g. metal sheet, selected to withstand the said operating temperatures, but not required to withstand high pressures. The unit includes an outer shell 4, which may also comprise sheet metal, of substantially greater thickness so as to constitute a pressure enclosure. To ensure the requisite heat isolation between the inner shell 2 and outer shell 4 of the heat storage unit, there is provided between the shells or walls 2 and 4 a heat barrier or screening assembly constructed in accordance with the present invention.

The screening assembly, generally designated 3, comprises a number of fine radiation-screening elements which may comprise wire mesh made from wire 0.11 millimeter thick with intervening mesh openings of 0.168 millimeter width, i.e. a ratio of 73.6% of solid to apertured areas. Between the adjacent radiation screens are conduction-arresting spacer elements which may comprise wire of 0.180 mm. gauge thickness and intervening mesh openings 0.75 mm. wide, a ratio of 34.4% of solid to open areas. The spacer elements serve to minimize conduction between the adjacent radiation screens. With such an arrangement, using about ten or twelve fine radiation-screening elements spaced by a corresponding number of intervening conduction-arresting spacer elements, it is found that in the continuous operation of the heat-storage unit, the outer surface of outer shell 4 can be consistently kept at a temperature not higher than 200° C. when the inner shell 2 is maintained at the above-indicated operating temperature of 900° *C*.

Referring to FIG. 2, a self-supporting heat-screening structure according to the invention is shown in larger-scale view as comprising a lamination of alternately disposed fine radiation-arresting screen elements 5 and conduction-arresting spacer screen elements 6, which may be respectively dimensioned as indicated above. Conveniently, the inner, outer and side surfaces of the resulting screening assembly are bounded by solid sheet metal elements such as 7, 8 and 9, which may be about 1 to 2 mm. thick. The resulting heat barrier assemblies in the form of prefabricated self-supporting structures may be constructed in standard sizes for ready insertion, in any desired number, between or over surfaces at high and/or low temperatures, from and/or to which heat transfer is to be minimized.

What we claim is:

1. Heat barrier assembly between two parallel surfaces comprising two spaced parallel walls, a plurality of wire-mesh radiation-arresting screen elements parallel to and between said walls with a large number of small mesh openings per unit area, and wire-mesh conduction-arresting spacer elements interposed between the adjacent screen elements having a substantially smaller number of substantially larger mesh openings per unit area whereby the wire mesh elements cause a temperature reduction between said walls.

2. Heat barrier assembly as claimed in claim 1, having means for assembling said screen and spacer elements into a self-supporting structure.

3. Heat barrier assembly as claimed in claim 1 wherein an outer side of the assembly is supported in direct engagement with one of two surfaces at different temperatures that are to be thermally screened from one another.

References Cited by the Examiner

UNITED STATES PATENTS

| | | | |
|---|---|---|---|
| 1,734,274 | 11/1929 | Schubart | 165—166 |
| 2,540,331 | 2/1951 | Hlavaty | 165—136 X |

ROBERT A. O'LEARY, *Primary Examiner.*

CHARLES SUKALO, *Examiner.*

A. W. DAVIS, *Assistant Examiner.*